United States Patent
Piron et al.

(10) Patent No.: US 10,311,586 B2
(45) Date of Patent: Jun. 4, 2019

(54) SYSTEMS AND METHODS FOR ANATOMY-BASED REGISTRATION OF MEDICAL IMAGES ACQUIRED WITH DIFFERENT IMAGING MODALITIES

(71) Applicant: SYNAPTIVE MEDICAL (BARBADOS) INC., Bridgetown (BB)

(72) Inventors: Cameron A. Piron, Toronto (CA); Jeff Stainsby, Toronto (CA)

(73) Assignee: Synaptive Medical (Barbados) Inc., Bridgetown (BB)

( * ) Notice: Subject to any disclaimer, the term of this patent is extended or adjusted under 35 U.S.C. 154(b) by 0 days.

(21) Appl. No.: 15/327,450

(22) PCT Filed: Sep. 18, 2014

(86) PCT No.: PCT/IB2014/001878
§ 371 (c)(1),
(2) Date: Jan. 19, 2017

(87) PCT Pub. No.: WO2016/042351
PCT Pub. Date: Mar. 24, 2016

(65) Prior Publication Data
US 2017/0186180 A1   Jun. 29, 2017

(51) Int. Cl.
*G06T 3/00*   (2006.01)
*G06T 7/00*   (2017.01)
*G06T 7/33*   (2017.01)

(52) U.S. Cl.
CPC ............ *G06T 7/33* (2017.01); *G06T 3/0068* (2013.01); *G06T 7/0012* (2013.01);
(Continued)

(58) Field of Classification Search
CPC . G06T 2207/10081; G06T 2207/10088; G06T 2207/10124; G06T 2207/30008
See application file for complete search history.

(56) References Cited

U.S. PATENT DOCUMENTS

| | | | |
|---|---|---|---|
| 2002/0042569 A1 | 4/2002 | Wedeen | |
| 2010/0087727 A1* | 4/2010 | Gross | A61B 5/055 600/411 |

(Continued)

OTHER PUBLICATIONS

Scheys, Lennart, Loeckx, Dirk, Spaepen, Arthur, Suetens, Paul, Jonkers, Ilsa. ("Atlas-based non-rigid image registration to automatically define line-of-action muscle models: A validation study") Journal of Biomechanics. 2009.*

(Continued)

*Primary Examiner* — Kim Y Vu
*Assistant Examiner* — Molly Delaney
(74) *Attorney, Agent, or Firm* — Quarles & Brady LLP (57) ABSTRACT

Systems and methods for co-registering medical images obtained with different imaging modalities are provided. For instance, images obtained with x-ray imaging, such as x-ray computed tomography ("CT"), can be co-registered with images obtained with magnetic resonance imaging ("MRI"). The different imaging modalities generate images that have different visualization characteristics for tissues; thus, in general, co-registration is accomplished by identifying different anatomical features in the different images and then utilizing a known spatial relationship between those anatomical features to co-register the different images.

14 Claims, 7 Drawing Sheets

(52) U.S. Cl.
CPC ............... *G06T 2207/10081* (2013.01); *G06T 2207/10088* (2013.01); *G06T 2207/10124* (2013.01); *G06T 2207/30008* (2013.01); *G06T 2207/30016* (2013.01)

(56) References Cited

U.S. PATENT DOCUMENTS

| | | | |
|---|---|---|---|
| 2010/0296718 A1* | 11/2010 | Ostrovsky-Berman | G06T 7/62 382/133 |
| 2012/0172700 A1* | 7/2012 | Krishnan | A61B 6/032 600/407 |
| 2013/0230454 A1 | 9/2013 | Gardner et al. | |

OTHER PUBLICATIONS

Basser, Peter J, Jones, Derek K, "Diffusion-tensor MRI: theory, experimental design and data analysis—a technical review" NMR in Bioscience. 2002.*

The International Search Report and Written Opinion dated Jan. 27, 2015 for International Application PCT/IB2014/001878.

* cited by examiner

SYSTEMS AND METHODS FOR ANATOMY-BASED REGISTRATION OF MEDICAL IMAGES ACQUIRED WITH DIFFERENT IMAGING MODALITIES

CROSS-REFERENCE TO RELATED APPLICATIONS

This application represents the national stage entry of PCT International Application PCT/IB2014/001878, filed Sep. 18, 2014. The contents of this application are hereby incorporated by reference as set forth in their entirety herein.

BACKGROUND OF THE INVENTION

The field of the invention is systems and methods for medical imaging. More particularly, the invention relates to systems and methods for co-registering medical images acquired with different imaging modalities.

Different imaging modalities have different strengths and weaknesses for visualizing different structures. For example, x-ray computed tomography ("CT") is particularly good at imaging bony structures and magnetic resonance imaging ("MRI") is particularly good at obtaining soft tissue contrast.

For surgical planning and intra-operative guidance, it can be desirable to simultaneously display information from multiple imaging modalities to leverage the benefits of each modality. For example, in orthopedic surgery the visualization of bones, ligaments, and tendons is important to the surgical intervention. The ability to register images obtained from different modalities can be challenging because images obtained with different modalities may depict different anatomical and physiological structures, such as bone versus soft tissue.

Thus, there remains a need to provide systems and methods that are capable of reliably combining image data from multiple modalities, such as CT and MRI, and displaying the results in an effective manner during an intra-operative procedure. For instance, the registration of multiple three-dimensional imaging volumes usually relies on the identification of common anatomic, or other, landmarks in each of the imaging volumes. When the imaging volumes have significantly different relative contrasts in these key structures (e.g., bone versus tissue), as is often the case with CT and MRI, the registration task becomes very challenging.

SUMMARY OF THE INVENTION

The present invention overcomes the aforementioned drawbacks by providing a system and method for registering a first medical image with a second medical image using a computer system. A first medical image acquired with a first imaging modality is provided to the computer system. The first imaging modality is at least one of x-ray imaging or magnetic resonance imaging ("MRI"). A second medical image acquired with an MRI system is also provided to the computer system. A first set of anatomical features is identified in the first medical image, and a second set of anatomical features, which has a known spatial relationship with the first set of anatomical features, is identified in the second medical image. The first set of anatomical features includes at least one anatomical landmark on a bony structure, and the second set of anatomical features includes at least one of an anatomical landmark on a bony structure, or a portion of a fibrous connective tissue. The computer system is then directed to determine registration parameters based on the first set of anatomical features, the second set of anatomical features, and the known spatial relationship between the first and second sets of anatomical features. The computer systems is then directed to co-register the first medical image and the second medical image using the determined registration parameters.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Described here are systems and methods for co-registering medical images obtained with different imaging modalities. For instance, images obtained with x-ray imaging, such as x-ray computed tomography ("CT"), can be co-registered with images obtained with magnetic resonance imaging ("MRI"). Because different imaging modalities generate images that have different visualization characteristics for tissues, it is often difficult to directly register images obtained with different imaging modalities.

The systems and methods of the present invention overcome the limitations of co-registering images obtained with different imaging modalities by identifying anatomical features in the images obtained with the different imaging modalities and utilizing known spatial relationships between the anatomical features to align the images. As one example, if one image provides a good visualization of bony structures, and another image provides good visualization of soft tissues, including fibrous connective tissue, then the two images can be co-registered based on anatomical features in the respective images and the known spatial relationships between those features. For instance, regions on the bony structure where fibrous connective tissues originate or insert can be identified and used to align the bony structure image with the soft tissue image based on the known anatomical relationship between the bony structure and fibrous connective tissues.

The systems and methods of the present invention thus identify anatomical or functional landmarks in a first imaging volume acquired with a first imaging modality and then relate those landmarks to other anatomical or functional landmarks in other imaging modalities to assist in the registration between those imaging volumes. The use of these anatomical or functional landmarks can improve registration accuracy and speed or can simplify the registration complexity and may therefore assist in performing these kinds of registrations in an intra-operative environment.

Figure 1:
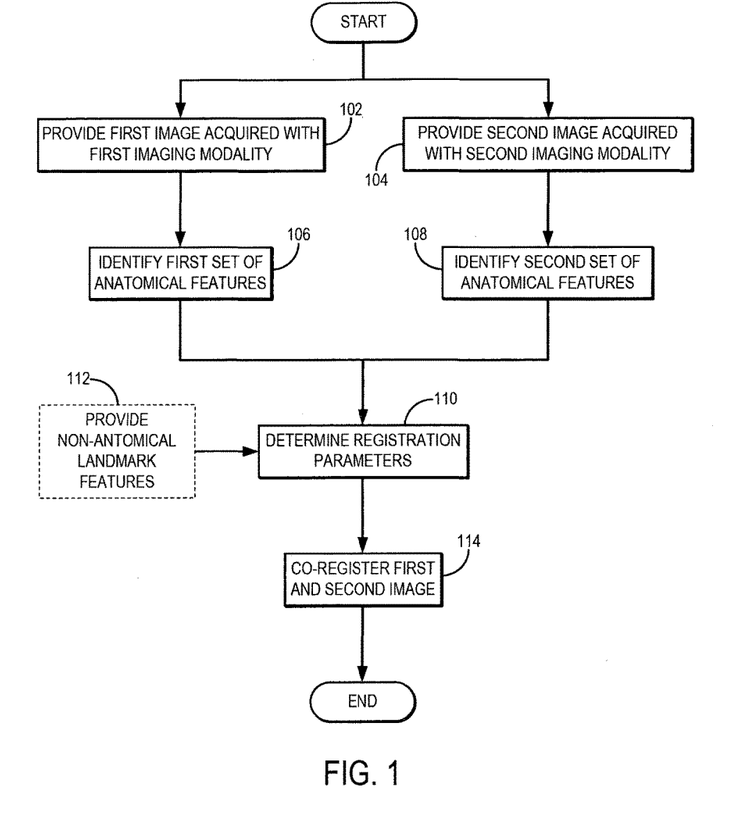
FIG. 1 is a flowchart setting forth the steps of an example method for co-registering medical images acquired with different imaging modalities based on anatomical features identified in the images and on known spatial relationships between the anatomical features.

Referring now to FIG. 1, a flowchart is illustrated as setting forth the steps of an example method for co-registering medical images acquired with different imaging modalities based on different anatomical features identified in the images.

The method includes providing a first medical image acquired with a first imaging modality, as indicated at step 102. As one example, the first imaging modality can be x-ray imaging and the first medical image can be an image acquired with a CT system. As such, the first medical image provides visualization of bony structures in the subject being image.

Figure 2:
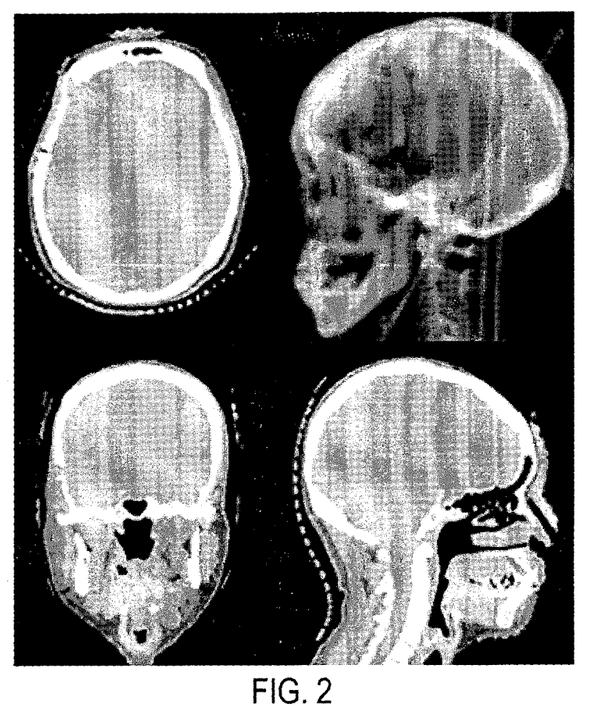
FIG. 2 is an example of images acquired with a computed tomography ("CT") imaging system and of a digitally reconstructed radiograph ("DRR")

FIG. 2 illustrates examples of typical CT images of a skull in three orthogonal planes in addition to a digitally reconstructed radiograph ("DRR") in the upper right panel. These images are representative of images acquired with x-ray imaging that provide good visualization of bony structures.

Referring again to FIG. 1, the method also includes providing a second medical image acquired with a second imaging modality, as indicated at step 104. As one example, the second imaging modality can be MRI and the second medical image can be an image acquired with an MRI system. In some embodiments, the second medical image can be acquired using diffusion-weighted MRI techniques, including diffusion tensor imaging ("DTI"), to visualize organized, fibrous structures such as fibrous connective tissue. The known relationships between fibrous connective tissues and their associated bones can then be used for the registration, as described below. In some other embodiments, the second medical image can be acquired using ultrashort echo time ("UTE") MRI methods, which can be used to directly image bony structures.

Figure 3:
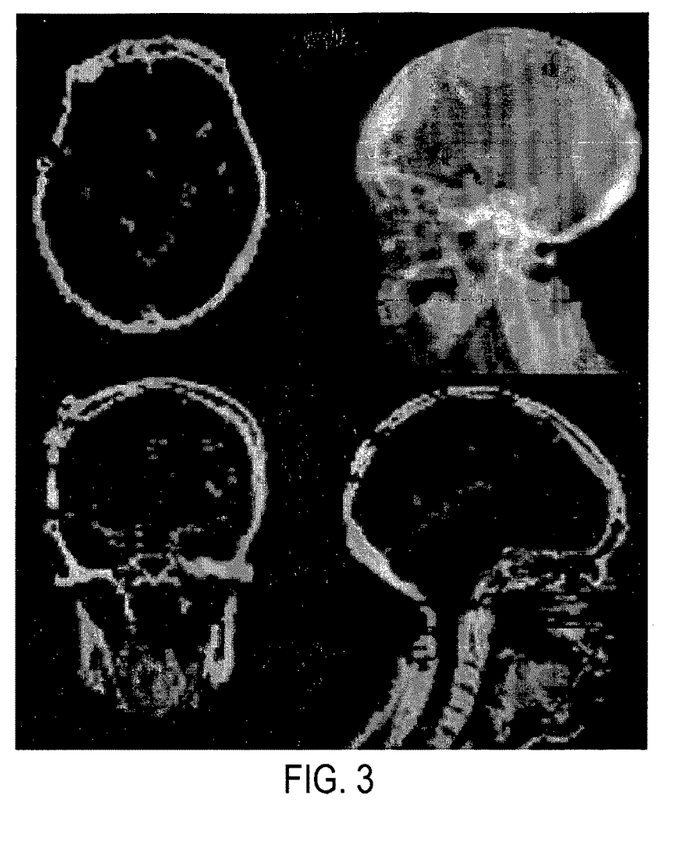
FIG. 3 is an example of images acquired with a magnetic resonance imaging ("MRI") system using an ultrashort echo time ("UTE") pulse sequence, and of a DRR.

FIG. 3 illustrates example of typical magnetic resonance images acquired using a UTE sequence, in addition to a DRR in the upper right panel. These images are representative of images acquired with an MRI system that provide good visualization of bony structures and, therefore, can be used to identify anatomical features based on those bony structures similar to the anatomical features that can be identified in x-ray images.

Referring again to FIG. 1, a first set of anatomical features is identified in the first medical image, as indicated at step 106. In some embodiments, these anatomical features can be manually identified by a user. In some other embodiments, these anatomical features can be identified automatically or semi-automatically, such as by using atlas-based methods. For instance, an image-based atlas that indicates the visualization of anatomical structures in the first imaging modality can be used to automatically or semi-automatically identify the first set of anatomical features in the first medical image.

By way of example, the first set of anatomical features can include bony structures or portions thereof. For instance, the first set of anatomical features can be anatomical landmarks or other locations on a bony structure. In some embodiments, the first set of anatomical features includes one or more insertion points or origin points on a bony structure. An insertion point can include those points on a bony structure where a muscle inserts via a tendon, or where other fibrous connective tissue, such as a ligament or fascia, inserts on the bony structure. Likewise, an origin point can include those points on a bony structure where a muscle originates via a tendon, or where other fibrous connective tissue, such as a ligament or fascia, originates on the bony structure. Because the anatomical locations of these origin and insertion points are well known, they can be used as anatomical landmarks for co-registering images in which bony structures may not be visible.

A second set of anatomical features is identified in the second medical image, as indicated at step 108. In some embodiments, these anatomical features can be manually identified by a user. In some other embodiments, these anatomical features can be identified automatically or semi-automatically, such as by using atlas-based methods. In general, the second set of anatomical features is different from, but related to, the first set of anatomical features. For instance, an image-based atlas that indicates the visualization of anatomical structures in the second imaging modality can be used to automatically or semi-automatically identify the second set of anatomical features in the second medical image.

By way of example, because bony structures are difficult to image with MRI, the other anatomic structures that have known spatial relationships with bony structures can be identified and used as the basis for registering a magnetic resonance imaging volume to a bony-structure based volume, such as an x-ray imaging or CT imaging volume.

As one example, the second set of anatomical features can include fibrous connective tissue or portions thereof. For instance, the second set of anatomical features can include the beginning or end point of a tendon or ligament. In general, these terminal points of a tendon or ligament correspond to an origin or insertion point on a bony structure. As such, the terminal points of the tendon or ligament have a unique spatial relationship with the related origin or insertion point on the bony structure. The different anatomical feature sets thus provide different, but complementary information that can be used to improve the co-registration of the first and second medical images. As will be described below, this spatial relationship can be used as the basis for calculating registration parameters between the first medical image and the second medical image.

In some embodiments, however, the second set of anatomical features can be the same as the first set of anatomical features. For instance, the anatomical features can include bony structures or portions thereof, as described above. In such embodiments, the first imaging modality may be x-ray imaging and the second imaging modality may be MRI, in which an imaging technique that is capable of providing visualization of bony structures is utilized. For example, UTE MRI methods can be used to directly image bony structures. The co-registration of the magnetic resonance images and x-ray images can then be based on direct bony structure landmark registration between the UTE and x-ray imaging volumes.

These embodiments are particularly useful for radiation treatment planning and guidance, where it is desirable to reduce the unnecessary radiation dose imparted to the patient. Accordingly, the radiation treatment can be guided using magnetic resonance images that are acquired during the treatment procedure and co-registered with a CT imaging volume that was acquired during the treatment planning stage. With this approach, the patient does not need to be exposed to additional radiation from an x-ray imaging source during treatment.

After the first and second anatomical feature sets have been identified in the first and second medical images, respectively, registration parameters are calculated based on the known spatial relationship between the first and second sets of anatomical features, as indicated at step 110. For example, the first and second anatomical feature sets can be related by the known origin and insertion of tendons, ligaments, aponeuroses, fasciae, or other fibrous connective tissue on bony structures. Based on these known spatial relationships, a transformation between the two anatomical feature sets can be calculated and used to co-register the first and second medical images.

In some embodiments, additional information from non-anatomical landmark sources can be provided to guide the registration process, as indicated at step 112. For example, external, common reference points can be used to further guide the registration. As one example, in orthopedic surgery various positioning devices may be fixed to the patient. When such devices are in use, landmark points can be defined as being located on the device, or as being related to the known attachment points of the device. These additional landmark points, which can be visualized in the first medical image, the second medical image, or both, can be used as additional landmark points for registration purposes.

The calculated registration parameters are thus used to co-register the first and second medical images, as indicated at step 114. The aforementioned processes can be repeated for any number of images in an image series or image volume such that the image series or image volume can be co-registered.

Figure 4A:
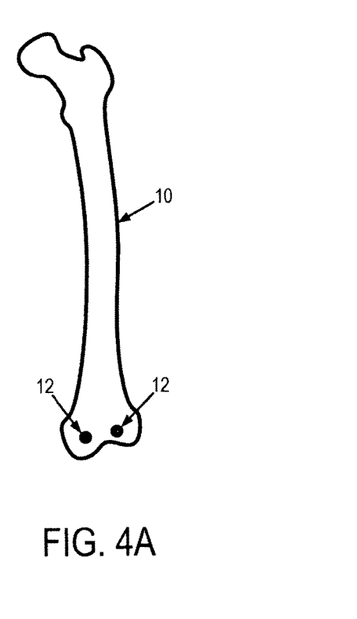
FIGS. 4A-4D depict examples of bony structures and soft tissue, including muscles and fibrous connective tissue, and the co-registration of these anatomical features based on the known spatial relationships between the bony structure and the fibrous connective tissue.
Figure 4B:
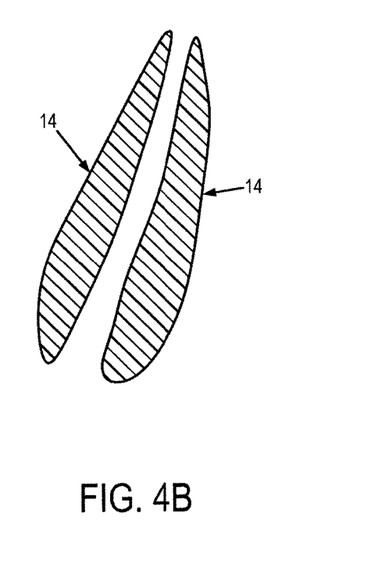

An illustrative example of the foregoing registration method can be described with respect to FIGS. 4A-4D. By way of example, FIG. 4A represents a first medical image of a subject acquired with a first imaging modality and FIG. 4B represents a second medical image acquired with a second imaging modality. For instance, FIG. 4A represents an image acquired with x-ray imaging, which has good visualization characteristics for bone, and FIG. 4B represents an image acquired with MRI, which has good visualization characteristics for soft tissues, but poor visualization characteristics for bony structures.

FIG. 4A represents an image of a bony structure 10 in a subject. Because the anatomy of the bony structure is known, the origin and insertion points for different fibrous connective tissues that attach to the bony structure 10 can be identified in the image. These anatomical features can include the origins and insertions of muscles via tendons, or the origins and insertions of different ligaments or fascia. In the example illustrated in FIG. 4A, the insertion points 12 for different muscles that attach to the bony structure 10 are known and can be identified in the image.

FIG. 4B represents an image of soft tissues, including muscles 14 that surround the bony structure 10. The image represented in FIG. 4B depicts the muscles 14 well, but does not provide significant differentiation of tendons and ligaments. Thus, in some embodiments, the soft tissue image can be acquired using an imaging technique that improves the visualization of fibrous connective tissue, including tendons, ligaments, fasciae, and aponeuroses.

Figure 4C:
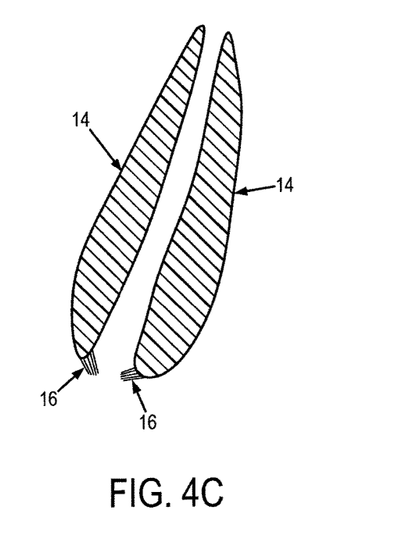

An example of a soft tissue image acquired using an imaging technique that improves the visualization of fibrous connective tissue is illustrated in FIG. 4C, in which tendons 16 are depicted in addition to the muscles 14. By way of example, the image technique that improves the visualization of fibrous connective tissues can include diffusion-weighted imaging. More particularly, the soft tissue image can include a tractography map that is produced using information from diffusion tensors that are computed from diffusion-weighted magnetic resonance images. This tractography map depicts the microstructure of the fibrous connective tissue and, thus, provides an accurate visualization of the terminal points of the fibrous connective tissue.

Figure 4D:
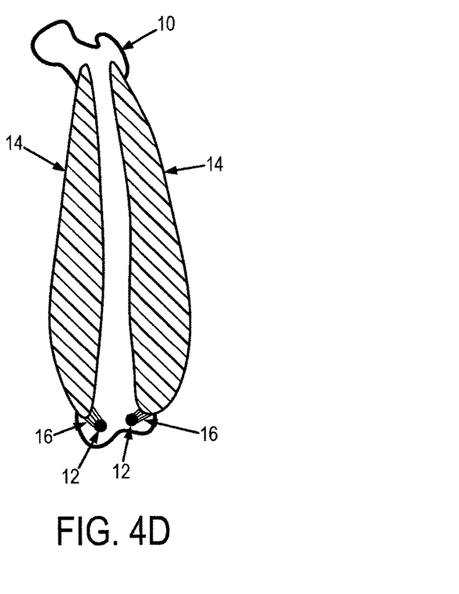

By spatially registering the end points of the tendons 16 in the soft tissue image and the insertion points 12 on the bony structure 10, registration parameters can be calculated and used to co-register the first and second medical images. As such, the respective image volumes can be aligned to show the soft tissue in the appropriate spatial orientation and scaling relative to the bony structure, as illustrated in FIG. 4D.

Figure 5:
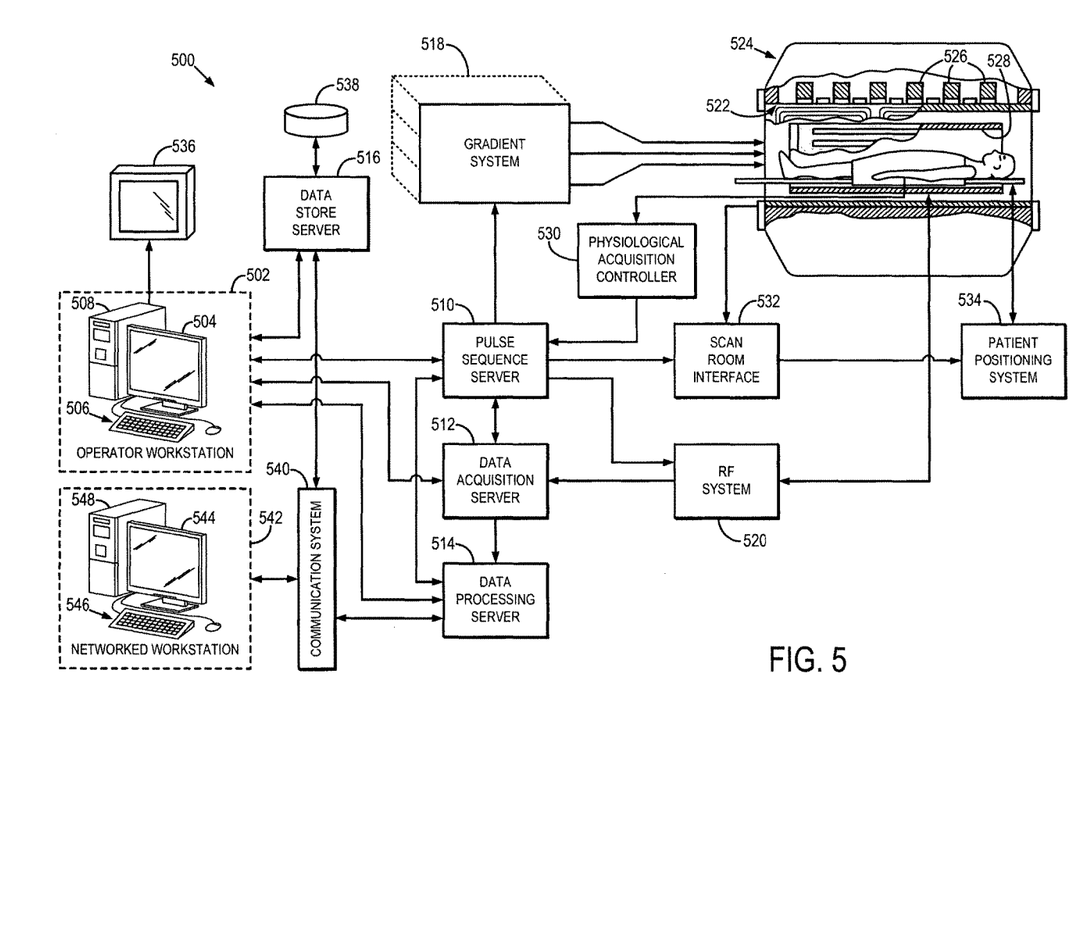
FIG. 5 is a block diagram of an example of an MRI system.

Referring particularly now to FIG. 5, an example of a magnetic resonance imaging ("MRI") system 500 is illustrated. The MRI system 500 includes an operator workstation 502, which will typically include a display 504; one or more input devices 506, such as a keyboard and mouse; and a processor 508. The processor 508 may include a commercially available programmable machine running a commercially available operating system. The operator workstation 502 provides the operator interface that enables scan prescriptions to be entered into the MRI system 500. In general, the operator workstation 502 may be coupled to four servers: a pulse sequence server 510; a data acquisition server 512; a data processing server 514; and a data store server 516. The operator workstation 502 and each server 510, 512, 514, and 516 are connected to communicate with each other. For example, the servers 510, 512, 514, and 516 may be connected via a communication system 540, which may include any suitable network connection, whether wired, wireless, or a combination of both. As an example, the communication system 540 may include both proprietary or dedicated networks, as well as open networks, such as the internet.

The pulse sequence server 510 functions in response to instructions downloaded from the operator workstation 502 to operate a gradient system 518 and a radiofrequency ("RF") system 520. Gradient waveforms necessary to perform the prescribed scan are produced and applied to the gradient system 518, which excites gradient coils in an assembly 522 to produce the magnetic field gradients $G_x$, $G_y$, and $G_z$ used for position encoding magnetic resonance signals. The gradient coil assembly 522 forms part of a magnet assembly 524 that includes a polarizing magnet 526 and a whole-body RF coil 528.

RF waveforms are applied by the RF system 520 to the RF coil 528, or a separate local coil (not shown in FIG. 5), in order to perform the prescribed magnetic resonance pulse sequence. Responsive magnetic resonance signals detected by the RF coil 528, or a separate local coil (not shown in FIG. 5), are received by the RF system 520, where they are amplified, demodulated, filtered, and digitized under direction of commands produced by the pulse sequence server 510. The RF system 520 includes an RF transmitter for producing a wide variety of RF pulses used in MRI pulse sequences. The RF transmitter is responsive to the scan prescription and direction from the pulse sequence server 510 to produce RF pulses of the desired frequency, phase, and pulse amplitude waveform. The generated RF pulses may be applied to the whole-body RF coil 528 or to one or more local coils or coil arrays (not shown in FIG. 5).

The RF system 520 also includes one or more RF receiver channels. Each RF receiver channel includes an RF preamplifier that amplifies the magnetic resonance signal received by the coil 528 to which it is connected, and a detector that detects and digitizes the I and Q quadrature components of the received magnetic resonance signal. The magnitude of the received magnetic resonance signal may, therefore, be determined at any sampled point by the square root of the sum of the squares of the I and Q components:

$$M=\sqrt{I^2+Q^2} \qquad (1);$$

and the phase of the received magnetic resonance signal may also be determined according to the following relationship:

$$\varphi = \tan^{-1}\left(\frac{Q}{I}\right). \qquad (2)$$

The pulse sequence server 510 also optionally receives patient data from a physiological acquisition controller 530. By way of example, the physiological acquisition controller 530 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 510 to synchronize, or "gate," the performance of the scan with the subject's heart beat or respiration.

The pulse sequence server 510 also connects to a scan room interface circuit 532 that receives signals from various sensors associated with the condition of the patient and the magnet system. It is also through the scan room interface circuit 532 that a patient positioning system 534 receives commands to move the patient to desired positions during the scan.

The digitized magnetic resonance signal samples produced by the RF system 520 are received by the data acquisition server 512. The data acquisition server 512 operates in response to instructions downloaded from the operator workstation 502 to receive the real-time magnetic resonance data and provide buffer storage, such that no data is lost by data overrun. In some scans, the data acquisition server 512 does little more than pass the acquired magnetic resonance data to the data processor server 514. However, in scans that require information derived from acquired magnetic resonance data to control the further performance of the scan, the data acquisition server 512 is programmed to produce such information and convey it to the pulse sequence server 510. For example, during prescans, magnetic resonance data is acquired and used to calibrate the pulse sequence performed by the pulse sequence server 510. As another example, navigator signals may be acquired and used to adjust the operating parameters of the RF system 520 or the gradient system 518, or to control the view order in which k-space is sampled. In still another example, the data acquisition server 512 may also be employed to process magnetic resonance signals used to detect the arrival of a contrast agent in a magnetic resonance angiography ("MRA") scan. By way of example, the data acquisition server 512 acquires magnetic resonance data and processes it in real-time to produce information that is used to control the scan.

The data processing server 514 receives magnetic resonance data from the data acquisition server 512 and processes it in accordance with instructions downloaded from the operator workstation 502. Such processing may, for example, include one or more of the following: reconstructing two-dimensional or three-dimensional images by performing a Fourier transformation of raw k-space data; performing other image reconstruction algorithms, such as iterative or backprojection reconstruction algorithms; applying filters to raw k-space data or to reconstructed images; generating functional magnetic resonance images; calculating motion or flow images; and so on.

Images reconstructed by the data processing server 514 are conveyed back to the operator workstation 502 where they are stored. Real-time images are stored in a data base memory cache (not shown in FIG. 5), from which they may be output to operator display 512 or a display 536 that is located near the magnet assembly 524 for use by attending physicians. Batch mode images or selected real time images are stored in a host database on disc storage 538. When such images have been reconstructed and transferred to storage, the data processing server 514 notifies the data store server 516 on the operator workstation 502. The operator workstation 502 may be used by an operator to archive the images, produce films, or send the images via a network to other facilities.

The MRI system 500 may also include one or more networked workstations 542. By way of example, a networked workstation 542 may include a display 544; one or more input devices 546, such as a keyboard and mouse; and a processor 548. The networked workstation 542 may be located within the same facility as the operator workstation 502, or in a different facility, such as a different healthcare institution or clinic.

The networked workstation 542, whether within the same facility or in a different facility as the operator workstation 502, may gain remote access to the data processing server 514 or data store server 516 via the communication system 540. Accordingly, multiple networked workstations 542 may have access to the data processing server 514 and the data store server 516. In this manner, magnetic resonance data, reconstructed images, or other data may be exchanged between the data processing server 514 or the data store server 516 and the networked workstations 542, such that the data or images may be remotely processed by a networked workstation 542. This data may be exchanged in any suitable format, such as in accordance with the transmission control protocol ("TCP"), the Internet protocol ("IP"), or other known or suitable protocols.

Figure 6A:
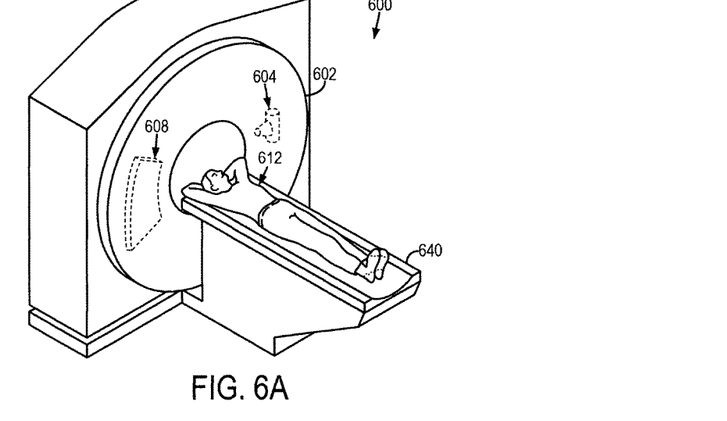
FIG. 6A is an example of a CT imaging system.
Figure 6B:
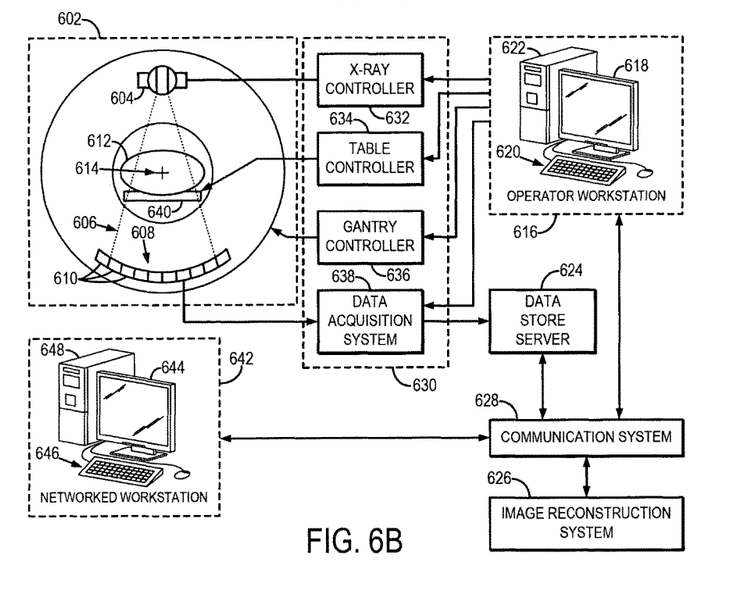
FIG. 6B is a block diagram of an example of a CT imaging system.

Referring particularly now to FIGS. 6A and 6B, an example of an x-ray computed tomography ("CT") imaging system 600 is illustrated. The CT system 600 includes a gantry 602, to which at least one x-ray source 604 is coupled. The x-ray source 604 projects an x-ray beam 606, which may be a fan-beam or cone-beam of x-rays, towards a detector array 608 on the opposite side of the gantry 602. The detector array 608 includes a number of x-ray detector elements 610. Together, the x-ray detector elements 610 sense the projected x-rays 606 that pass through a subject 612, such as a medical patient or an object undergoing examination, that is positioned in the CT system 600. As one example, each x-ray detector element 610 produces an electrical signal that may represent the intensity of an impinging x-ray beam and, hence, the attenuation of the beam as it passes through the subject 612. In some configurations, each x-ray detector 610 is capable of counting the number of x-ray photons that impinge upon the detector 610.

During a scan to acquire x-ray projection data, the gantry 602 and the components mounted thereon rotate about a center of rotation 614 located within the CT system 600.

The CT system 600 also includes an operator workstation 616, which typically includes a display 618; one or more input devices 620, such as a keyboard and mouse; and a computer processor 622. The computer processor 622 may include a commercially available programmable machine running a commercially available operating system. The operator workstation 616 provides the operator interface that enables scanning control parameters to be entered into the CT system 600. In general, the operator workstation 616 is in communication with a data store server 624 and an image reconstruction system 626. By way of example, the operator workstation 616, data store sever 624, and image reconstruction system 626 may be connected via a communication system 628, which may include any suitable network connection, whether wired, wireless, or a combination of both. As an example, the communication system 628 may include both proprietary or dedicated networks, as well as open networks, such as the internet.

The operator workstation 616 is also in communication with a control system 630 that controls operation of the CT system 600. The control system 630 generally includes an x-ray controller 632, a table controller 634, a gantry controller 636, and a data acquisition system 638. The x-ray controller 632 provides power and timing signals to the x-ray source 604 and the gantry controller 636 controls the rotational speed and position of the gantry 602. The table controller 634 controls a table 640 to position the subject 612 in the gantry 602 of the CT system 600.

The DAS 638 samples data from the detector elements 610 and converts the data to digital signals for subsequent processing. For instance, digitized x-ray data is communicated from the DAS 638 to the data store server 624. The image reconstruction system 626 then retrieves the x-ray data from the data store server 624 and reconstructs an image therefrom. The image reconstruction system 626 may include a commercially available computer processor, or may be a highly parallel computer architecture, such as a system that includes multiple-core processors and massively parallel, high-density computing devices. Optionally, image reconstruction can also be performed on the processor 622 in the operator workstation 616. Reconstructed images can then be communicated back to the data store server 624 for storage or to the operator workstation 616 to be displayed to the operator or clinician.

The CT system 600 may also include one or more networked workstations 642. By way of example, a networked workstation 642 may include a display 644; one or more input devices 646, such as a keyboard and mouse; and a processor 648. The networked workstation 642 may be located within the same facility as the operator workstation 616, or in a different facility, such as a different healthcare institution or clinic.

The networked workstation 642, whether within the same facility or in a different facility as the operator workstation 616, may gain remote access to the data store server 624 and/or the image reconstruction system 626 via the communication system 628. Accordingly, multiple networked workstations 642 may have access to the data store server 624 and/or image reconstruction system 626. In this manner, x-ray data, reconstructed images, or other data may be exchanged between the data store server 624, the image reconstruction system 626, and the networked workstations 642, such that the data or images may be remotely processed by a networked workstation 642. This data may be exchanged in any suitable format, such as in accordance with the transmission control protocol ("TCP"), the internet protocol ("IP"), or other known or suitable protocols.

Figure 7:
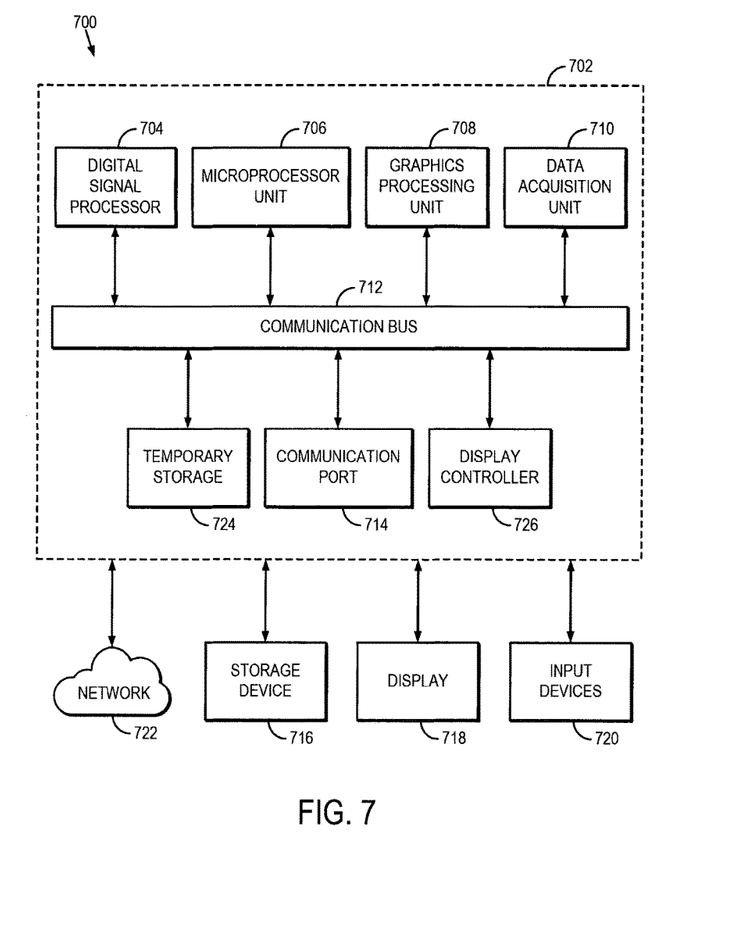
FIG. 7 is a block diagram of an example computer system that can be configured to implement the methods described herein.

Referring now to FIG. 7, a block diagram of an example computer system 700 that can be configured to co-register medical images acquired with different imaging modalities, as described above, is illustrated. The medical images to be co-registered can be provided to the computer system 700 from the respective medical imaging systems, such as an MRI system and a CT system, or from a data storage device, and are received in a processing unit 702.

In some embodiments, the processing unit 702 can include one or more processors. As an example, the processing unit 702 may include one or more of a digital signal processor ("DSP") 704, a microprocessor unit ("MPU") 706, and a graphics processing unit ("GPU") 708. The processing unit 702 can also include a data acquisition unit 710 that is configured to electronically receive data to be processed, which may include first and second medical images, image series, or image volumes. The DSP 704, MPU 706, GPU 708, and data acquisition unit 710 are all coupled to a communication bus 712. As an example, the communication bus 712 can be a group of wires, or a hardwire used for switching data between the peripherals or between any component in the processing unit 702.

The DSP 704 can be configured to receive and processes the first and second medical images. The MPU 706 and GPU 708 can also be configured to process the first and second medical images in conjunction with the DSP 704. As an example, the MPU 706 can be configured to control the operation of components in the processing unit 702 and can include instructions to perform processing of the first and second medical images on the DSP 704. Also as an example, the GPU 708 can process image graphics.

In some embodiments, the DSP 704 can be configured to process the first and second medical images received by the processing unit 702 in accordance with the algorithms described above. Thus, the DSP 704 can be configured to identify anatomical features in the images, to calculate registration parameters based on the identified anatomical features and known spatial relationships therebetween, and to co-register the images using the registration parameters.

The processing unit 702 preferably includes a communication port 714 in electronic communication with other devices, which may include a storage device 716, a display 718, and one or more input devices 720. Examples of an input device 720 include, but are not limited to, a keyboard, a mouse, and a touch screen through which a user can provide an input.

The storage device 716 is configured to store images, whether provided to or processed by the processing unit 702. The display 718 is used to display images, such as images that may be stored in the storage device 716, and other information. Thus, in some embodiments, the storage device 716 and the display 718 can be used for displaying the images before and after registration and for outputting other information, such as data plots or other reports based on the registration process.

The processing unit 702 can also be in electronic communication with a network 722 to transmit and receive data, including CT images, MR images, and other information. The communication port 714 can also be coupled to the processing unit 702 through a switched central resource, for example the communication bus 712.

The processing unit 702 can also include a temporary storage 724 and a display controller 726. As an example, the temporary storage 724 can store temporary information. For instance, the temporary storage 724 can be a random access memory.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for registering a first medical image with a second medical image using a computer system, the steps of the method comprising:
   (a) providing a first medical image acquired with a first imaging modality to a computer system, wherein the first imaging modality is at least one of x-ray imaging or magnetic resonance imaging (MRI);
   (b) providing a second medical image acquired with an MRI system to the computer system, wherein the second medical image is acquired using one of an ultrashort echo time (UTE) imaging technique or a diffusion-weighted imaging technique;
   (c) identifying a first set of anatomical features in the first medical image, the first set of anatomical features including at least one anatomical landmark on a bony structure;
   (d) identifying in the second medical image, a second set of anatomical features that includes anatomical features that are different from the anatomical features in the first set of anatomical features, the second set of anatomical features having a known spatial relationship with the first set of anatomical features and including at least one of an anatomical landmark on a bony structure or a portion of a fibrous connective tissue;
   (e) directing the computer system to determine registration parameters based on the first set of anatomical features, the second set of anatomical features, and the known spatial relationship between the first and second sets of anatomical features; and
   (f) directing the computer system to co-register the first medical image and the second medical image using the determined registration parameters.

2. The method as recited in claim 1, wherein the set of first anatomical features is depicted in the first medical image and not depicted in the second medical image.

3. The method as recited in claim 1, wherein the at least one anatomical landmark in the first set of anatomical features includes at least one of an insertion point on a bony structure or an origin point on a bony structure.

4. The method as recited in claim 1, wherein the at least one anatomical landmark in the second set of anatomical features includes at least one portion of a fibrous connective tissue, and the fibrous connective tissue includes at least one of a tendon, a ligament, or an aponeurosis.

5. The method as recited in claim 1, wherein the first set of anatomical features and the second set of anatomical features respectively comprise different anatomical features on a bony structure.

6. The method as recited in claim 5, wherein the set of anatomical features on the bony structure includes at least one of an insertion point or an origin point on the bony structure.

7. The method as recited in claim 1, wherein the first medical image depicts a bony structure and the second medical image depicts soft tissue including at least one fibrous connective tissue.

8. The method as recited in claim 7, wherein the at least one anatomical landmark in the first set of anatomical features includes at least one of an insertion point or an origin point of the at least one fibrous connective tissue on the bony structure.

9. The method as recited in claim 8, wherein the at least one anatomical landmark in the second set of anatomical features includes a portion of fibrous connective tissue comprising one of a tendon, a ligament, or an aponeurosis.

10. The method as recited in claim 8, wherein the at least one anatomical landmark in the second set of anatomical features includes at least one of a beginning point or an end point of the fibrous connective tissue.

11. The method as recited in claim 1, wherein the second medical image is a tractography map that indicates structure of fibers in the fibrous connective tissue.

12. The method as recited in claim 1, wherein step (c) includes identifying the first set of anatomical features in the first medical image using an atlas that indicates a visualization of subject anatomy for the first imaging modality.

13. The method as recited in claim 1, wherein step (d) includes identifying the second set of anatomical features in the second medical image using an atlas that indicates a visualization of subject anatomy for magnetic resonance imaging.

14. The method as recited in claim 1, wherein the first imaging modality is MRI and the first medical image is acquired using an ultrashort echo time (UTE) imaging technique.

* * * * *